March 25, 1941. W. L. MORRISON 2,236,412
AUTOMOBILE VENTILATING DEVICE
Filed May 9, 1938 2 Sheets-Sheet 1
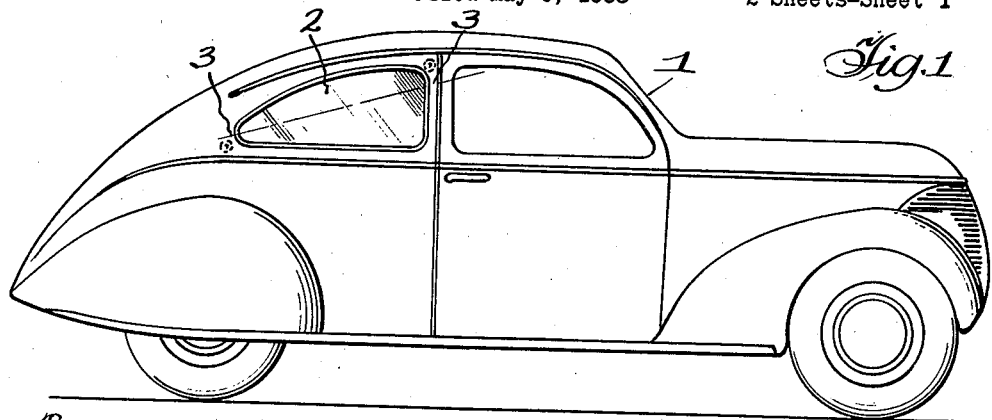
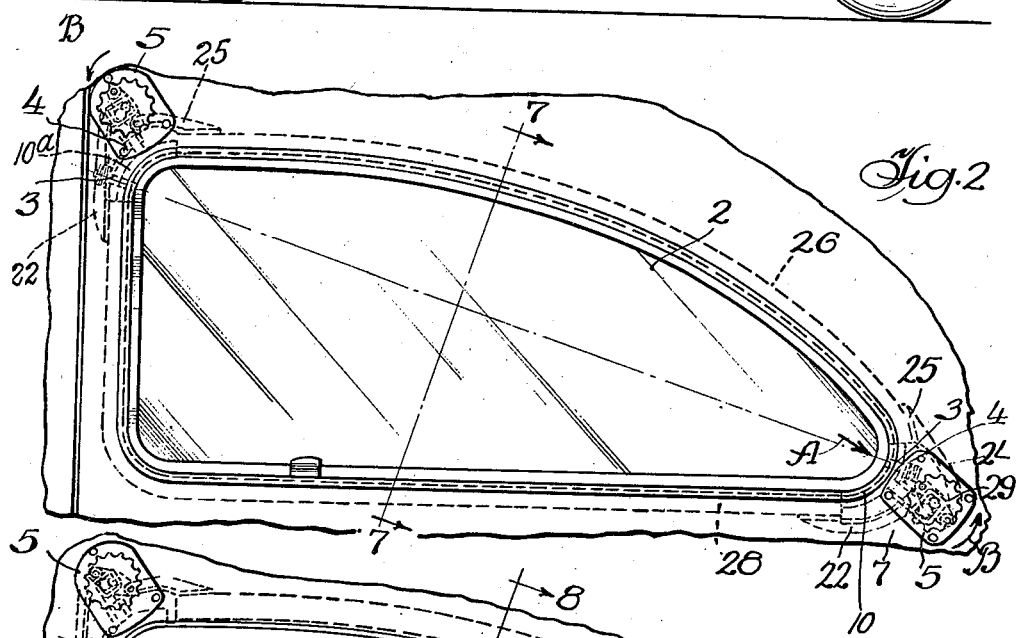
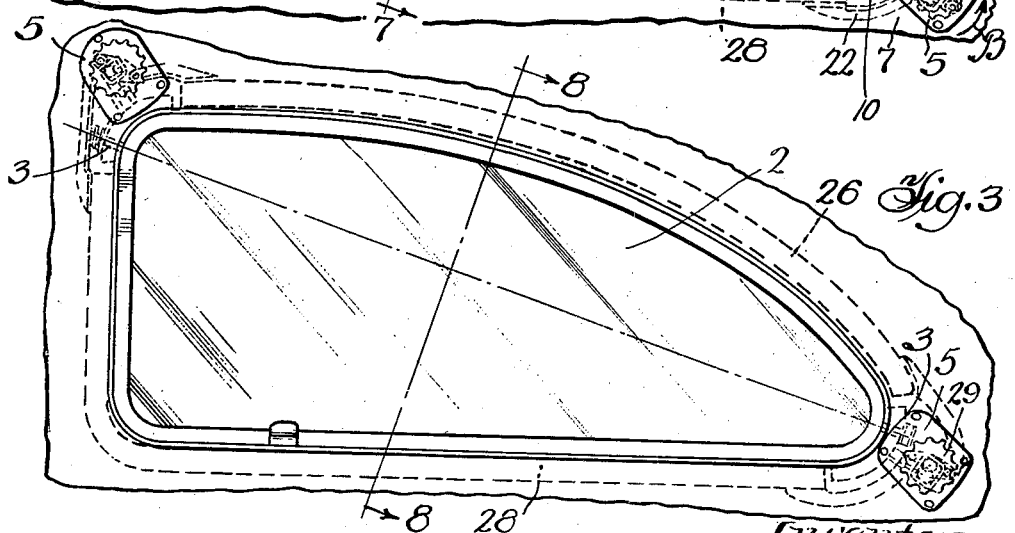
Inventor,
Willard L. Morrison,
By Parker & Carter Attys.

March 25, 1941.  W. L. MORRISON  2,236,412
AUTOMOBILE VENTILATING DEVICE
Filed May 9, 1938  2 Sheets-Sheet 2
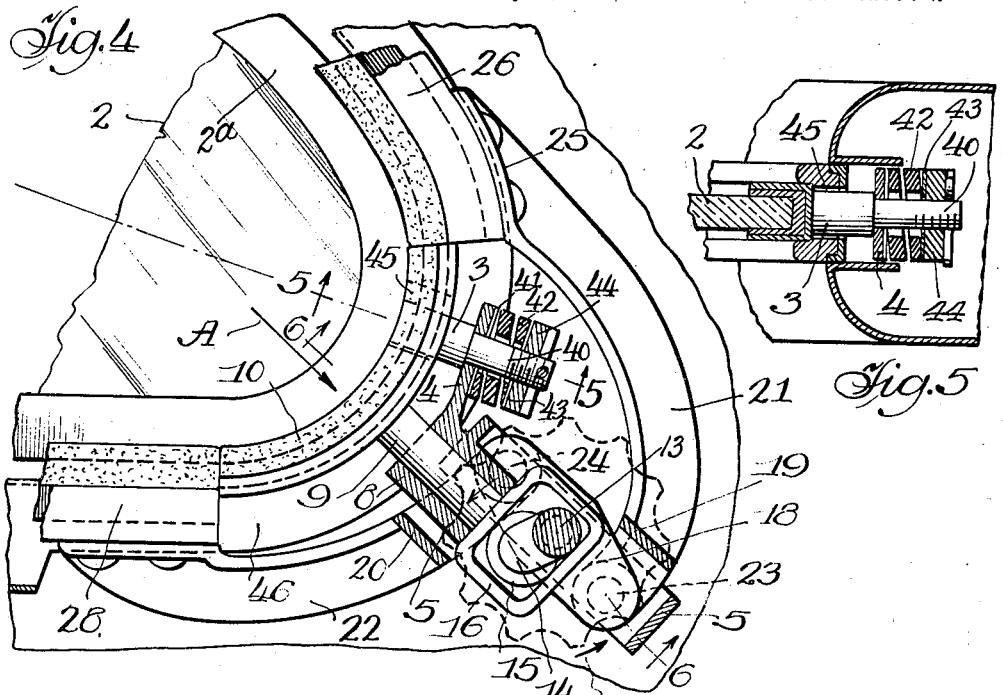
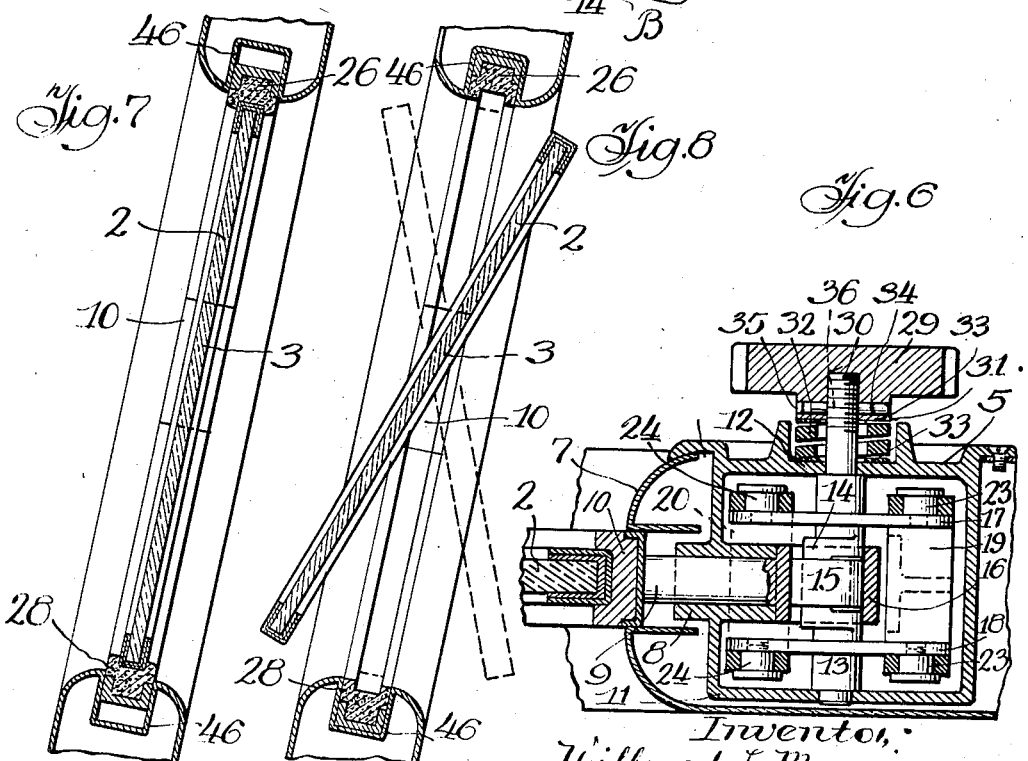
Inventor,
Willard L. Morrison,
By Parker & Carter Attys.

Patented Mar. 25, 1941

2,236,412

UNITED STATES PATENT OFFICE 2,236,412

AUTOMOBILE VENTILATING DEVICE

Willard L. Morrison, Lake Forest, Ill.

Application May 9, 1938, Serial No. 206,745

6 Claims. (Cl. 296—44)

This invention relates to automobile ventilating devices and has for its object to provide a new and improved device of this description.

The invention has as a further object to provide a ventilating window particularly adapted for substantially straight-sided automobile bodies.

The invention has as a further object to provide a ventilating window for automobiles pivoted so as to move about an inclined axis extending in a generally longitudinal direction. The invention has as a further object to provide a pivoted ventilating window for automobiles particularly adapted for windows whose length is greater than their height. The invention has as a further object to provide a ventilating window for automobiles with two pivots, one located in proximity to each end of the window. The invention has as a further object to provide a pivoted ventilating window for automobiles, with pivots widely separated longitudinally of the automobile which are substantially in alignment.

The invention has as a further object to provide a ventilating window for automobiles which is pivotally mounted so that the upper edge moves outwardly and the lower edge moves inwardly, the forward top portion of the window remaining substantially closed and the rear top portion being opened when the window is pivotally moved.

The invention has as a further object to provide a pivoted ventilating window for automobiles adapted for universal use regardless of the shape of the sides of the automobiles.

The invention has as a further object to provide a pivoted ventilating window for automobiles which decreases in height toward one end and which is pivoted to move about an axis running in an inclined generally longitudinal direction. The invention has as a further object to provide a pivoted window which may be used as a ventilating device and as a rain shield to direct rain outside of the automobile.

The invention has as a further object to provide a ventilating window for automobiles, with a movable sealing device, the window being arranged so that it can be moved so that the inner edge can project into the automobile or outside of the automobile. The invention has as a further object to provide a ventilating window for automobiles, provided with a sealing means wherein the sealing means acts as a lock to hold the window in its closed position. The invention has as a further object to provide a pivoted ventilating window for automobiles with sealing means and means for moving the sealing means away from the window to release it and toward the window to seal it.

The invention has further objects which are more particularly pointed out in the accompanying description.

Referring now to the drawings,

Fig. 1 is a side elevation showing one form of my invention;

Fig. 2 is an enlarged view of the rear window, showing portions of the walls surrounding it and with the window closed and the seal engaging the window to prevent leakage and pivotal movement, the position of the window being reversed from that shown in Fig. 1;

Fig. 3 is a view similar to Fig. 2, but having the seal disengaged from the window;

Fig. 4 is an enlarged view of the lower right hand end of Fig. 2, in part section;

Fig. 5 is a sectional view taken on line 5—5 of Fig. 4;

Fig. 6 is an enlarged sectional view taken on line 6—6 of Fig. 4;

Fig. 7 is an enlarged sectional view taken on line 7—7 of Fig. 2; and

Fig. 8 is an enlarged sectional view taken on line 8—8 of Fig. 3.

Like numerals refer to like parts throughout the several figures.

Referring now to the drawings, I have illustrated in Fig. 1 an automobile 1 which may be of any suitable make, design or shape. I have illustrated this automobile as having a rear window 2 which is shown as being a long window, that is considerably longer longitudinally than vertically of the automobile, but of course any other size window may be utilized. I have also shown this window as pointed at one end, but it may of course be of other shapes.

The window is provided with pivots 3, 3, one at each end, the front pivot being near the upper edge of the window and the rear pivot being near the lower edge of the window. The window in this particular construction moves about an axis which is indicated by the line extending between the pivots 3, 3. It is of course evident that the pivots might be located in some other convenient position, but they should be so located that the window moves about an inclined axis extending in a generally longitudinal direction of the automobile.

I have illustrated the window as having the frame 2a, the pivots 3 being connected with this frame. I also prefer to provide means so that the window can be properly sealed and can still be moved about its axis in either direction so that the top portion of the window may be moved outwardly and the bottom portion inwardly, or the top portion inwardly and the bottom portion outwardly. To facilitate this movement and to provide a sealing device which will also act to lock the window in position, I provide a sealing device which is movable toward and away from the window. When the sealing device is moved away from the window, the window may be moved around its pivots and when the sealing device is moved toward the window, the space around the window is accurately and completely sealed and the window is held against movement around its pivots. Various constructions for this purpose may be used and as herein shown, I have arranged the sealing device in a plurality of sections and have provided means for moving these sections away and toward the window.

In this construction, the pivots 3 are pivotally mounted in brackets 4, one at each end of the window. The bracket 4 is connected to a frame 5 which is inserted in an opening in the body 7 of the automobile, see Figs. 4 and 6. This frame is provided with a guide member 8 into which is received a controlling member 9 attached to the sealing section 10 at one end of the window. Mounted in this frame is an oscillating shaft 13 which is mounted in the members 11 and 12 of the frame 5. This shaft has a crank portion 14 which engages a guide member 16 attached to the controlling member 9. The crank portion 14 is preferably provided with the roller 15, the roller engaging the guide member 16. On opposite sides of the crank 14 are the members 17 and 18 fixed to the shaft 13 and which are provided with the projections 23 and 24 which act as pivots for the bifurcated ends 19 and 20 of the arms 21 and 22, see Figs. 4 and 6. The arm 21 is connected to the sealing member 26 and the arm 22 is connected to the sealing member 28. The sealing members 26 and 28 extend along the top and bottom of the window. The sealing member 28 has a portion which extends along one end of the window. There is a sealing member 10a at the other end of the window. These sealing members are all provided with non-metallic sealing material, such as rubber, forming a part of the parts 10, 26, 28 and 10a. This sealing material is provided with a groove extending entirely around the window and into which the edge of the window is received when the sealing members are moved toward the window and the sealing material is in its sealing position, as shown, for example, in Fig. 7. When the sealing members are moved away from the window, as shown, for example, in Fig. 8, then the window is free to move about its pivots. The frame members 46 into which the sealing members are received limit any undue motion of the sealing members.

There is an actuating device 29 connected with the shaft 13 which may be in the form of a knurled thumb or hand wheel arranged so that when turned, the shaft 13 will be rocked. The part 29 as herein shown has a threaded opening and the end of the shaft 13 is threaded. It is provided with a hub 31 which is arranged to compress a spring friction device which holds the parts in any position to which they are moved. In the construction shown the friction device consists of a spring 32, one end of which is pressed against the plate 12 of the frame 5. The hub 31 presses against the other end of the spring and there are friction plates 33 between the spring and the plate 12 and the hub 31. By tightening the thumb wheel 29 the spring will be compressed so as to secure the desired friction and then the parts are held in this position by a pin 34 which passes through one of a plurality of holes 35 in the hub 31 and a hole 36 in the end of the shaft 13.

When the shaft 13 is rocked in one direction, the crank 14 and roller 15 by engaging the guide member 16, causes the controlling member 9 and the sealing member 10 to be moved outwardly away from the window in the direction of the arrow A, so as to release the window from the sealing member 10. The rubber portion of the sealing member 10 is provided with an elongated slot 45 so as to permit it to be moved without clamping, due to the relative angular positions of the part 9 and the pivot 3. This same movement through the agency of the members 17 and 18 and the members 21 and 22, which are connected thereto by the bifurcated ends 19 and 20, causes the sealing members 26 and 28 to move away from the window so as to release the window from these sealing members.

There is a similar thumb or hand wheel 29 associated with the pivot 3 at the other end of the window and parts similar to those shown in Figs. 4 and 6 for moving the sealing member 10 and the other ends of the sealing members 26 and 28. Since the mechanism is similar at each end of the window, I have only shown that at one end in detail, it being understood the mechanism of the other end is simply a duplication of this mechanism.

Referring now to the pivot 3, this pivot is arranged so as to be a friction pivot. In the construction shown this pivot has a reduced end which passes through the bracket 4 and which has a shoulder engaging the bracket, see Fig. 4. I have shown this pivot as being a spring friction pivot which has the friction spring 42 surrounding it and there is a nut 44 which engages the threaded end of the pivot and which when screwed down, compresses the spring 42 to secure the desired amount of friction. There are preferably friction washers 41 and 43 interposed between the spring and the bracket 4 and the nut 44. The nut 44 is held in any of its adjusted positions by a pin passing through the pivot and being received in one of the grooves of the nut. This nut is shown as a castellated nut. The pivot 3 at the other end may be a friction pivot if desired. It will be seen that by this means, the window when moved to any of its adjusted positions, will be held in that position by the friction pivot or pivots. It will be seen that the sealing portions of the sealing device which engages the edge of the window when the sealing device is in its sealing position are in the same vertical plane as the window.

The use and operation of my invention are as follows.

When the window is closed, the sealing members are moved toward the window so as to engage the outer edges of the window to completely seal the window all the way around. This engagement is such as to make an absolutely tight seal all around the window and, furthermore, to act as a lock to prevent the window from being opened.

When it is desired to open the window, the thumb wheels 29 are rotated and this causes the sealing members 10, 10a, 26 and 28 to be moved away from the window so as to release it. The window may then be moved about the pivots 3.

For ventilating purposes, the window is moved so that the upper edge is moved outwardly and the lower edge moved inwardly. In view of the position of the pivots, that is, the pivot at the front being up near the top and the pivot at the rear being near the bottom, when the top of the window is moved outwardly, the front end is not widely open, that is the upper edge at the front does not extend very far, if any at all, outwardly of the reveal or the side of the automobile body, whereas the rear upper edge is moved outwardly a considerable distance. This is very important, because no air is scooped inwards at the forward front edge. This allows the suction action of air passing over the top of the automobile, when the automobile is moving forward, to draw air outwardly at the top of the window and cause air to descend inside of the automobile at the bottom of the window, to take the place of the air drawn out.

It will therefore be seen that with this arrangement of the pivots, there is provided a window opening at the top outwardly and at the bottom inwardly, and yet, for all practical purposes, closed at the front top edge and open at the rear top edge. This also causes an arrangement where the window is open inwardly at the front bottom and closed inwardly at the rear bottom. It will thus be seen that by this arrangement the front end of the window is in such a position that it is not out in the air current so as to scoop in air at the bottom, but is open at the top, the opening enlarging toward the rear, and thus ventilation is secured by the suction produced by the air passing over the top of the automobile, thereby producing complete and satisfactory ventilation without air currents and without the scooping of air into the body of the automobile by means of the window. This result is produced by the arrangement of the pivots, this arrangement being such that the window moves about an inclined axis extending in a generally longitudinal direction. Furthermore, it will be seen that instead of having an opening at the top which is substantially the same throughout the length of the window, there is an opening which is comparatively smaller at the front end of the window and which increases in width from the front to the rear. The friction device holds the window in any position in which it is moved. If it should be raining, then the window is moved so that the upper portion is moved inside of the automobile and the lower portion outside. This leaves an opening, but prevents rain or snow from coming in the automobile, as it will be deflected by the window to the outside. When it is desired to close the window, it is moved to its closing position and then the hand wheels 29 are moved to move the sealing members so that they tightly engage the window all the way around. This seals the window completely and also prevents it from being opened from outside the automobile.

When it is desired to open the window, the hand wheels 29 are moved in the direction of the arrow B, see Fig. 2, to move the sealing element away from the window. It will be noted that the sealing member 28 has a portion which extends in a horizontal direction and another portion which extends in a substantially vertical direction. When the hand wheels 29 are moved to release the window the substantially vertical portion of the member 28 is moved away from the window and is also moved downwardly and the horizontal portion is also moved downwardly and horizontally so that the window is entirely released from the sealing device.

This window is substantially noiseless due to the fact that there is no part which sticks out in the current of air to be struck by this current at a sharp angle, so that the force of the current of air and the sudden change in direction thereof which causes the ordinary window to make a noise is entirely absent.

I claim:

1. An automobile ventilating device comprising a portion having a window opening therein, a window pivotally mounted therein on an inclined axis extending in a generally longitudinal direction, a sealing device of resilient material surrounding the window, and positive means for moving the sealing device toward the window to tightly press it against the window and for moving the sealing device away from the window to permit the upper edge of the window to be moved outwardly and the lower edge of the window to be moved inwardly into the interior of the automobile.

2. An automobile ventilating device comprising a portion having a window opening therein, a window therein, a pivot at each end of said window, one pivot being near the upper edge of the window and the other being near the lower edge of the window, the distance between the pivots being greater than the horizontal length of the window, means for releasing the window to permit it to be opened, said window when opened being inclined with its upper edge projecting outwardly of the automobile and its lower edge projecting inwardly of the automobile, the window forming an air deflector to scoop air into the automobile below the axis about which said window moves, and movable means engaging the outer peripheral edge of the window for holding it in its closed position.

3. An automobile ventilating device comprising a portion having a window opening therein, a window therein, pivots for pivotally mounting the window in the window opening, a movable sealing device of compressible resilient material surrounding said window and located between the window and the portion of the automobile surrounding the window opening, and actuating means for positively moving the sealing device out of contact with the peripheral edge of the window, to release the window so that it can be moved to open position.

4. An automobile ventilating device comprising a portion having a window opening therein, a window pivotally mounted in said window opening, sealing members surrounding the window, said sealing members interposed between the peripheral edge of the window and the portion of the automobile surrounding the window opening and having engaging portions of resilient material which engage the peripheral edge of the window, means for moving said sealing members into intimate contact with the peripheral edge of the window to form a seal therewith, and positive actuating mechanism for moving said sealing members away from the peripheral edge of the window to release the window to open it.

5. An automobile ventilating device comprising a portion having a window opening therein, a window pivotally mounted in said window opening, sealing members of compressible resilient material surrounding the window and tightly engaging it to seal the edges thereof and hold it against movement, and means for positively moving said sealing members away from the window and out of contact with the peripheral edge of the window so as to free it and permit it to be moved, said means comprising a rotatable shaft connected with said sealing members for positively moving said sealing members out of engagement with the periphery of the window to release it to open it.

6. An automobile ventilating device comprising a portion having a window opening therein, a generally triangular shaped window mounted in said opening, pivots near two of the angles of said triangular shaped window upon which the window is pivoted, the axis about which the window moves extending in a generally longtudinal direction across the window, four separated sealing members surrounding said window, provided with resilient material which engages the peripheral edge of the window, two separated actuating devices at opposite ends of the window, each actuating device actuating one adjacent sealing member independently, to move it out of contact wtih the peripheral edge of the window, both actuating members cooperating to move the other two sealing members to move them out of contact with the peripheral edge of said window.

WILLARD L. MORRISON.